United States Patent

[11] 3,592,476

[72] Inventor Donald K. MacDonald
1203 Belknap Court, Cupertino, Calif. 95014

[21] Appl. No. 8,223
[22] Filed Feb. 3, 1970
[45] Patented July 13, 1971
Continuation-in-part of application Ser. No. 657,555, Aug. 1, 1967, now abandoned.

[54] INDICATOR AND SHUTOFF FOR CARTRIDGE-TYPE TAPE RECORDERS
10 Claims, 2 Drawing Figs.

[52] U.S. Cl. .......... 274/4
[51] Int. Cl. .......... G11b 5/78
[50] Field of Search .......... 274/4, 11; 179/100.2 Z

[56] References Cited

UNITED STATES PATENTS

| | | | |
|---|---|---|---|
| 2,908,769 | 10/1959 | Fonda | 274/4 |
| 2,911,161 | 11/1959 | Proctor | 274/4 |
| 3,437,762 | 4/1969 | Lear et al. | 274/4 |
| 3,477,725 | 11/1969 | Housman | 274/4 |

*Primary Examiner*—Harry N. Haroian
*Attorney*—Sughrue, Rothwell, Mion, Zinn and Macpeak ABSTRACT: Apparatus for indicating the track being traversed by a magnetic record or playback head of a conventional endless loop cartridge-type tape recorder machine, and for shutting off the recorder machine when the tracks available for recording are exhausted or the cartridge-type recorder has completed its automatic head switching cycle to return the conventional endless cartridge continuous loop to its relative beginning or end, depending on its mode of operation, i.e., record or playback.

INVENTOR
DONALD K. MACDONALD

BY Sughrue, Rothwell, Mion,
Zinn & Macpeak
ATTORNEYS

INDICATOR AND SHUTOFF FOR CARTRIDGE-TYPE TAPE RECORDERS

CROSS-REFERENCE TO RELATED APPLICATION

This application is a continuation-in-part of application Ser. No. 657,555, filed Aug. 1, 1967, for Indicator and Shut-Off for Cartridge Type Tape Recorders now abandoned.

BACKGROUND OF THE INVENTION

This invention relates to endless cartridge-type magnetic tape machines adapted for recording and reproducing sound on multiple tracks, and particularly concerns an indicator system for indicating the track of the tape the magnetic head is traversing and for controlling shutoff of the machine after a predetermined number of tracks have been traversed.

Endless belt cartridge-type tape recorders are widely used where compactness is important and where it would be inconvenient to rewind or reverse the tape after each track has been played or recorded. In many of these recorders, provision is made for recording on and playing from as many as eight tracks. As one track (or set of tracks for stereo) is completed, a metal foil splicing strip on the tape completes a circuit between a voltage source and a head positioner solenoid which repositions the head to the next track level. If the recording is in stereo and if there are eight available tracks (four sets of tracks), the magnetic head will be repositioned three times while traversing the tape. At the end of the tape the magnetic head will be repositioned to the first set of tracks and the operation will repeat. In such systems, it is desirable for the operator to be able to detect which set of tracks the head is playing or recording upon. Further, it is highly desirable that the device be provided with means to automatically turn off the recorder machine at the end of the last track and before the first track; i.e., at the relative beginning or end of the conventional endless cartridge continuous loop, the machine will shut off to return the tape's informational length (vertical and horizontal) to its relative beginning or end, also to discontinue the continuous head switching cycle in phase with the tape's informational length (vertical and horizontal tape area), and to place the machine in its automatic shutoff standby mode of operation. With such an arrangement, blank conventional endless loop cartridge tapes can be recorded for playback without recording over the beginning of the endless tape and without having to wait anxiously until the foil head lifter switch actuated a predetermined number of times, thereby making it unnecessary for the operator to quickly turn off manually the recording machine.

SUMMARY OF THE INVENTION

According to the invention, a control circuit is associated with the magnetic head so that the operator can determine by optical means the level of the head (i.e., which set of tracks is being recorded or reproduced). The present system provides means for stopping operation automatically at the end of the recording or reproducing operation in a position relative to the informational length of said endless loop cartridge tape (i.e., at its relative beginning or end, depending on whether the mode of operation of the recorder machine is record or playback). This is especially important in the recording phase to prevent overrunning the informational end of the conventional endless tape loop when the head switching cycle is at its repositioned beginning. The automatic stopping system can be overridden for continuous reproduction and continuous recording. The device of this invention can easily be added without difficulty as a package unit to existing conventional endless cartridge-type recorders for both car and home use.

It is therefore an object of the present invention to provide an easy and reliable system of indication and automatic shutoff for any continuous playing endless loop cartridge tape recording and playback machine, whether for home or car use, that will allow the operator to pay little attention to the operational actions of the machine; indicate to the operator the relative beginning or end of the endless tape loop; and also, at the same time, indicate to the operator the position of the magnetic tape head relative to the beginning or end of the tape loop and its informational areas, depending on the machine's mode of operation, i.e., record or playback.

DESCRIPTION OF THE PREFERRED EMBODIMENTS

Figures 1, 2:
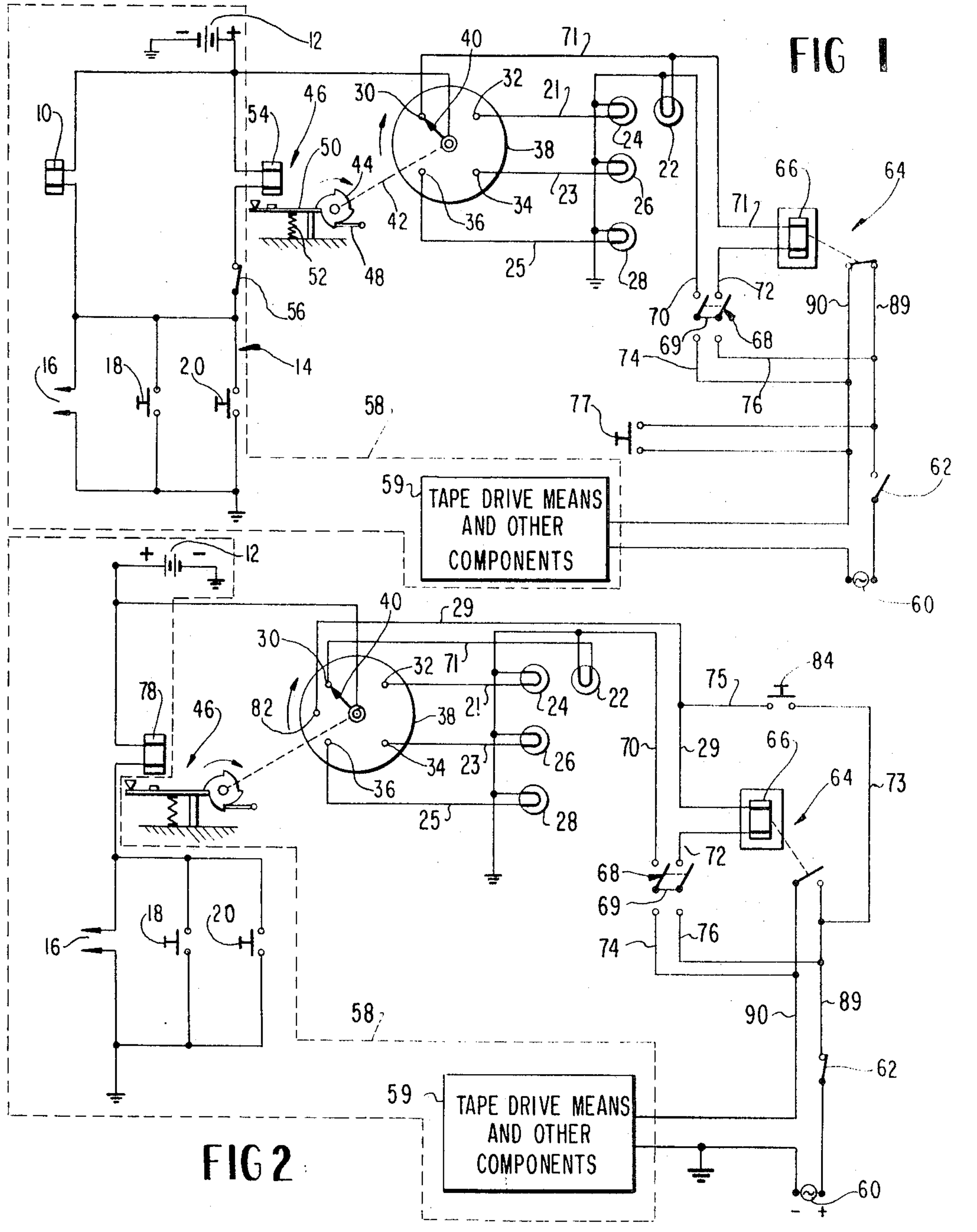
FIG. 1 is a schematic diagram of an electrical circuit of the apparatus of the present invention.
FIG. 2 is a schematic diagram of a modification of the electrical circuit shown in FIG. 1.

Referring to FIG. 1, a conventional endless tape cartridge recorder or playback machine 58 is provided with a magnetic head positioner solenoid 10 connected with power source 12 by switching circuit 14. Each time the circuit is momentarily completed, the solenoid 10 repositions the magnetic head to the next track (or set of tracks for stereo) on the tape in a known manner. Switching circuit 14 includes metal foil sensing contacts 16, manual head position momentary switch 18, and remote head position momentary switch 20. Foil sensing contacts 16 are so spaced that they can be electrically connected when a metal leader (not shown) carried at the end of each track on the tape contacts them. At that instant, the circuit including source 12, head positioner solenoid 10 and contacts 16 will be completed. Thus, head positioning solenoid 10 will be energized at the end of each track to index the magnetic head (not shown) to the next track in a known manner. This will continue to happen whenever the metal leader or switching point of the endless tape loop connects contacts 16. The operator can also energize solenoid 10 to reposition the head at any time during playback by closing either of momentary switches 18 or 20, thus bypassing metal foil sensing contacts 16.

Four head-position indicating lamps 22, 24, 26 and 28 are arranged to light when the magnetic head is in its first, second, third and fourth levels, respectively. The positive leads for the four-position indicating lamps are connected by leads 71, 21, 23 and 25, respectively, to fixed latched contacts 30, 32, 34 and 36 on stationary disc circuit level 38 of stepper switch 46. The fixed latched contacts are alternately connected with power source 12 by a conductive rotor 40 mounted on an insulated rotatable shaft 42 indicated by a broken line in FIG. 1. The shaft 42 is driven by a ratchet wheel 44 of the stepper switch 46. The wheel 44 is engaged by a detent spring 48 which holds the wheel in each of its latched step positions. Wheel 44 is stepped angularly by a finger at the end of armature 50. The armature 50 is biased away from the teeth of the wheel 44 by detent spring 52, but is advanced to move the wheel one step in a clockwise direction when solenoid 54 is energized. The solenoid 54 is connected in parallel to the head positioning solenoid 10 so that each time solenoid 10 is energized to advance the magnetic head to the next track, solenoid 54 is also energized by power supply 12. Each time solenoid 54 is energized, switch 46 is advanced one step and conductive rotor 40 moves one switch position in a clockwise direction to the next latched contact to light the corresponding head position indicating lamp, with the current going to ground. Thus, the operator can optically determine which track is being reproduced or recorded upon by the indication of the lamp that is lighted. The illustrated embodiment is for a recorder having four tracks or sets of track. Additional or fewer indicating lamps can be provided for recorders having more or less tracks.

If the indicator lamps 22, 24, 26 and 28 become unsynchronized with the position of the head, lamp reset switch 56 can be opened from its normally closed position and the magnetic head can thus be advanced by the closing of manual head position momentary switch 18, which serves to connect the solenoid 10 with the source 12, until the position of the head corresponds to the lamp which is lighted. Switch 56 is then closed and the indicating lamps will thereafter indicate the correct position of the magnetic head.

Tape recorder or player 58, which is of conventional construction that is well known in the prior art, includes the usual tape drive means and other components, shown generally at 59, which are connected to the head positioner solenoid 10, power source 12 and switching circuit 14 in a conventional manner. The recorder or player 58 is connected to AC power source 60 through an on-off switch 62 and latching relay 64. Latching relay 64 comprises a solenoid 66 connected in parallel to head position indicating lamp 22 by leads 70 and 71. The latching relay 64 has an open position and a closed position. In the closed position shown in FIG. 1, wherein it connects the leads 89 and 90, the latching relay 64 connects the power source 60 to the conventional endless tape cartridge recorder or player 58. In its open position, latching relay 64 breaks the connection between power source 60 and the recorder or player 58 by disconnecting lead 89 from lead 90.

A switch 68, having its center poles shorted by lead 69, is so arranged that, in its first or "automatic shutoff" position, it connects the leads 70 and 72 and completes a circuit from the lamp 22 to the solenoid 66 of the latching relay 64. When switch 68 is in the "automatic shutoff" position, the latching relay 64 will operate as described above. In its second or "override" position connecting leads 74 and 76, the switch 68 breaks the circuit from the lamp 22 to the latching relay 64 and completes a circuit from source 60 to the conventional endless tape cartridge recorder or player 58. Any suitable type of indicating means such as a lamp (not shown) may be connected to the switch 68 to indicate the position of the switch 68.

From the above description, it will be seen that the AC source 60 is used to drive the motor for the recorder or player 58, and the DC source 12 is used as power for the indicator and automatic shutoff circuit.

In operation, when the conventional endless tape cartridge recorder or player 58 is started by closing switch 62, latching relay 64 is in its closed position as shown in FIG. 1, and switch 68 is in its "automatic shutoff" position connecting leads 70 and 72, the recorder or player 58 will operate until the magnetic head shifts from the last track to the first track and stepping switch 46 returns to its first position wherein the rotor 40 is in engagement with the fixed contact 30 and indicating lamp 22 is lighted. At this instant, indicating lamp 22 is connected to the source 12 and solenoid 66 is energized to open latching relay 64, thereby turning off the recorder or player 58 by breaking the circuit between it and the source 60.

In order to restart the recorder or player 58, solenoid 66 must be reenergized or reset to close latching relay 64. The closing of reset switch 77 momentarily connects power supply 60 to the recorder or player 58. As the recorder or player 58 begins to run, lamp 22 is relit and solenoid 66 is energized to once again close latching relay 64. Reset switch 77 can then be opened and the recorder or player 58 will continue to operate. The first track of the tape will play or record until the metal foil sensing contacts 16 are closed by the metal foil strip (not shown) at the end of the track. This will energize solenoids 10 and 54 to reposition the magnetic head and index conductive rotor 40 to engage contact 32 and latch in that position wherein lamp 24 is energized by the source 12. Since the solenoid 66 is no longer connected to the source 12, the latching relay 64 will remain in its closed position until the solenoid is again energized after the magnetic head has traversed all of the tracks and has shifted from the last track to the first track in the manner described above.

The conventional endless tape cartridge recorder or player 58 can be continuously operated by the source 60 by moving switch 68 to its "override" position connecting leads 74 and 76. The latching relay 64 will then be disabled, but head position indicating lamps 22, 24, 26 and 28 will continue to indicate the tape track being reproduced or recorded upon in the manner described above.

In the embodiment shown in FIG. 2, like numerals are used to describe like elements as shown in FIG. 1. A single solenoid 78 is provided to position the magnetic head and to actuate step switch 46. Thus, when metal foil sensing contacts 16 or either of momentary switches 18 or 20 are closed in the manner described above, the head will be moved to the next succeeding track and rotor 40 will be rotated to the next fixed latched contact 30, 32, 34 or 36 to light a corresponding indicating lamp 22, 24, 26 or 28.

An additional fixed unlatched contact 82 is provided on stationary disc 38. Conductive rotor 40 brushes contact 82 in a sliding motion as it is moved in a clockwise direction from latched contact 36 to latched contact 30. This causes contact 82 to be momentarily connected to solenoid 66 of latching relay 64 by lead 29 so that the solenoid 66 is energized by power from source 12 as the rotor 40 moves from latched contact 36 to latched contact 30, thereby resulting in the opening of the relay 64 to disconnect the leads 89 and 90 and turn off the power to the recorder or player 58 just before the head is moved back to the first track. In order to restart the recorder or player 58 after latching relay 64 has opened, reset switch 84 is momentarily closed to produce a latching relay closing pulse from source 60 to solenoid 66 by positive source lead 89 through lead 73, through switch 84, through lead 75, and to solenoid 66 through lead 29. In the "automatic shutoff" position of switch 68, lead 72 is connected to ground lead 70 to allow a positive pulse from source 60 to operate latching relay 64.

While the invention has been particularly shown and described with reference to the preferred embodiments thereof, it will be understood by those skilled in the art that various changes in form and details may be made therein without departing from the spirit and scope of the invention.

I claim:

1. In a cartridge-type magnetic recorder-player machine adapted for recording and reproducing sound on endless tape having multiple tracks of the type having physical distinctions at the end of each track, comprising a first and second source of electrical power, an electric motor for operating the machine, a magnetic head, solenoid means for positioning said head from track to track, and detection means responsive to said physical distinctions of said tape to connect and disconnect said solenoid means to said first power source; the improvement comprising:

a. a stepper switch having a plurality of successive latched contact positions, said stepper switch being connected to said solenoid means such that said stepper switch moves to its next successive contact position each time said solenoid means is connected to said first power source by said detection means and remains at said latched position whenever said solenoid is deenergized by said detection means, b. a plurality of successively arranged head-position indicating means, each indicating means being electrically connected to one of said stepper switch contact positions, said stepper switch successively activating a succeeding indicating means each time said solenoid means is connected to said first power source by said detection means to thereby indicate each position of said magnetic head, said indicating means remaining activated until said solenoid means is again connected to said first power source, and c. a relay connected to one contact position of said stepper switch and having a latched closed position in which said machine is connected to said second power source and a latched open position in which said machine is disconnected from said second power source, said relay being movable from its latched closed position to its latched open position upon said stepper switch reaching said one of its plurality of positions and said relay remaining in its latched closed position when said stepper switch is in any other of its positions.

2. A cartridge-type magnetic tape machine as defined in claim 1 wherein said head position indicating means comprises a series of lamps, one for each position of the head.

3. A cartridge-type magnetic tape machine as defined in claim 1 further comprising an override switch connected in the circuit to said relay to deactivate said relay and to connect said machine to said second power source.

4. A cartridge-type magnetic tape machine as defined in claim 1 further comprising a reset switch to selectively connect said second power source to said machine when said relay is in said open position.

5. A cartridge-type magnetic tape machine as defined in claim 3 further comprising a reset switch to selectively connect said second power source to said machine when said relay is in said open position.

6. A cartridge-type magnetic tape machine as defined in claim 1 wherein said solenoid means comprises a single solenoid for positioning said head and for controlling said stepper switch.

7. A cartridge-type magnetic tape machine as defined in claim 1 further comprising a reset switch for selectively connecting said second power source to said relay to effect closing of said relay.

8. A cartridge-type magnetic tape machine as defined in claim 1 wherein said relay is moved from its latched closed position to its latched open position after said stepper switch has deactivated one of said other head-position indicating means and before it has activated said one position indicating means.

9. A cartridge-type magnetic tape machine as defined in claim 8 further comprising an unlatched contact on said stepper switch between said one contact position of said stepper switch and the contact position preceding said one position, said relay being connected to said unlatched contact such that said relay is movable from its latched closed position to its latched open position as said stepper switch is moved from said preceding contact position to said one position and said unlatched contact is engaged.

10. A cartridge-type magnetic tape machine as defined in claim 1 further comprising a manual head position switch for bypassing said detection means and connecting said solenoid means to said first power source.